Oct. 18, 1955
H. J. EARNEST
2,720,779
BUILDING BLOCK
Filed Feb. 2, 1948
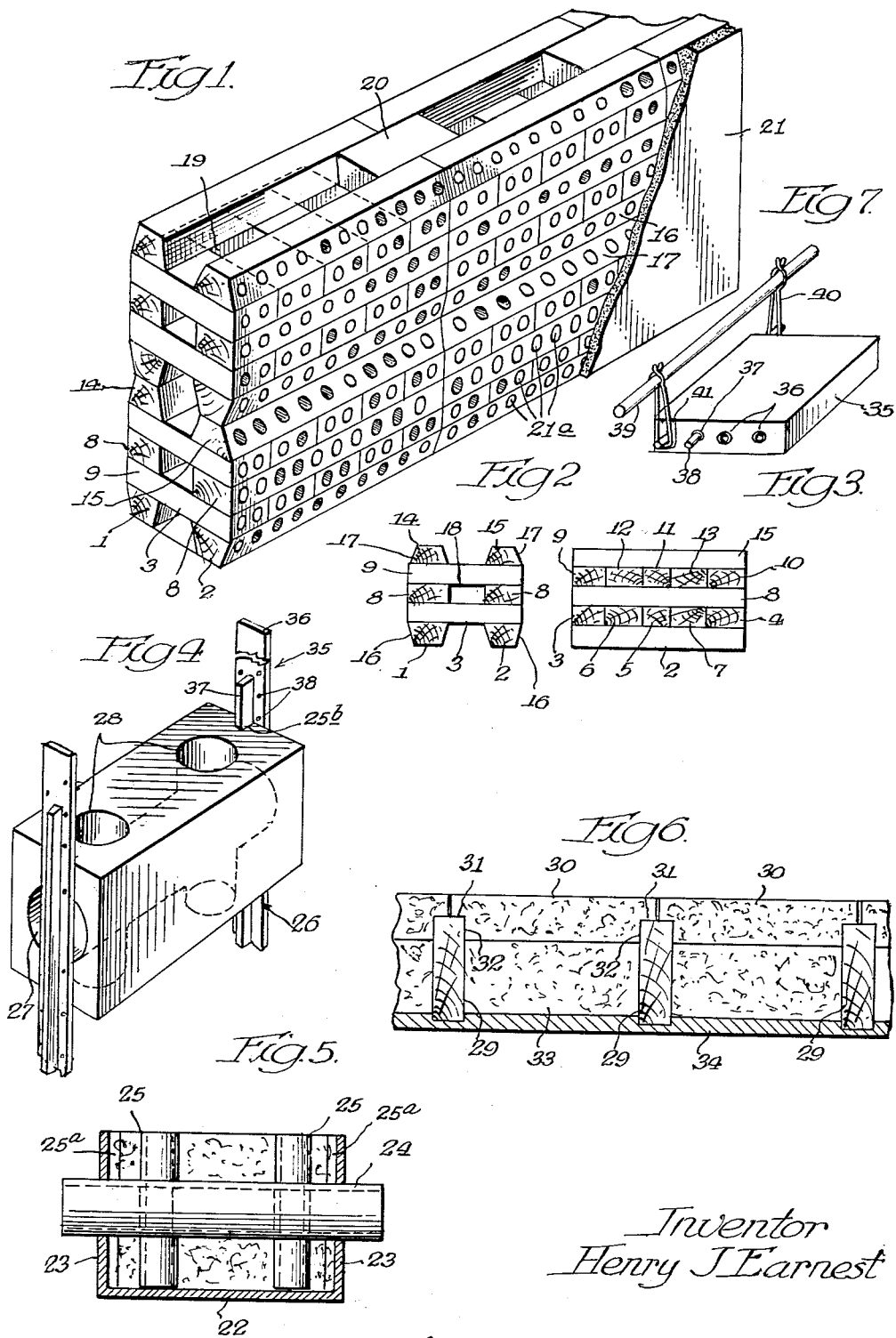
Inventor
Henry J Earnest
By: Spencer, Marzall, Johnston & Cook
Attys

United States Patent Office 2,720,779
Patented Oct. 18, 1955

2,720,779

BUILDING BLOCK

Henry J. Earnest, Chicago, Ill.

Application February 2, 1948, Serial No. 5,886

2 Claims. (Cl. 72—33)

This invention relates in general to materials useful in the construction of buildings, and has for the principal object thereof the production of building material from waste substances such as wood scraps.

Another object of the invention is to produce a building block which may be built up of a plurality of pieces of wood scrap or waste material and then placed together in such a way as to form a structure.

Still another object of the invention is to provide a novel form of building block, formed of wood scrap or waste material, which is so designed as to have passages therethrough for the purpose of conducting heat. The construction of the block is such as to enable it to be used in connection with so-called radiant heating if desired, although the block is not limited to such use.

A further object of the invention is to utilize wood scraps for a construction material wherein the wood may be ground to a substantially powder or finely divided form and then mixed with a suitable binder, wherein the resulting plastic mass may be utilized as exterior or interior coverings for the structure which has been built up from the wood building blocks.

A still further object of the invention is to provide a plastic substance formed of ground wood scraps wherein the plastic mass, depending upon the proportions of binder, may be molded onto blocks or other suitable types of members suitable for construction purposes and wherein the blocks may be provided with passageways therethrough for conducting heat through and within the walls of a structure.

Another object of the invention is to mold the plastic formed of ground wood pulp and binder into sheets of such form as to enable them to be used for forming a wall either on the inner or outer sides of studding, wherein insulating material may be placed between the walls on either side of the studding. The insulating material used may also utilize the plastic mass wherein the binder is combined with various types of scrap or waste material other than wood.

Other objects and advantages of the invention will become apparent upon reading the following description taken in conjunction with the accompanying drawing in which:

Fig. 1 is a fragmentary perspective view of a wall structure utilizing the building blocks formed of wood scrap or waste material and covered on one side thereof with the novel plastic substance of the present invention;

Fig. 2 is an end elevational view of one of the building blocks made in accordance with the invention;

Fig. 3 is a side elevational view of the block shown in Fig. 2;

Fig. 4 is a perspective view of a building block molded from the plastic substance of the present invention;

Fig. 5 is a vertical longitudinal sectional view through a mold useful in molding the building block shown in Fig. 4;

Fig. 6 is a fragmentary horizontal sectional view through a series of studding illustrating the use of molded sheets of the plastic material; and Fig. 7 is a perspective view of another type of construction member particularly adapted for use in ceilings.

A great deal of waste lumber always results from the construction of wooden buildings such as houses, barns, and the like. In addition to the waste resulting from the actual construction of buildings, a considerable amount of waste wood scrap also results in the actual production of lumber from trees. The present invention contemplates the utilization of such waste or scrap material, whether the pieces be large or small, for the production of additional building material. The invention herein also contemplates the further use of all parts of the tree, such as the smaller limbs, twigs, and the like, all of which may be ground to a finely divided form and used in the production of the plastic material embodied as a part of the present invention.

Referring now more particularly to the drawing and especially to Figs. 1, 2 and 3, a novel form of building block may be produced or built up from scrap or waste wood material which is useful in the construction of buildings, walls, and the like. One of the individual blocks so built up is illustrated in Figs. 2 and 3 and comprises a bottom pair of spaced substantially parallel elongated wood members 1 and 2. End members 3 and 4 extend transversely of the bottom members 1 and 2 at each end thereof and may be secured to such bottom members in any suitable manner, such as by nailing. A central member 5 also extends transversely across the bottom members 1 and 2, leaving spaces between the central member 5 and the end members 3 and 4. Intermediate members or blocks 6 and 7 are then placed on each of the bottom members 1 and 2 and between the central member 5 and the end members 3 and 4. These intermediate members or blocks 6 and 7 do not extend across the bottom members 1 and 2, but merely serve to fill in the spaces between the intermediate cross member 5 and the end members 3 and 4.

Another pair of spaced elongated wood bars 8 are then placed over the members 3, 4, 5, 6 and 7 at each side of the block and extend parallel to the bottom members 1 and 2. Other transverse end members 9 and 10 are then placed over the bars 8 at right angles thereto, and an intermediate cross member 11, similar to the member 5, is also placed across the bars 8 and is spaced from the end cross members 9 and 10, thus providing spaces therebetween. These spaces at each side of the main block are then filled with small wood inserts 12 and 13 at each side of the block. These inserts 12 and 13 do not extend across the width of the block, but are merely for the purpose of filling in and strengthening the sides of the block. Elongated bars 14 and 15 are then placed at the top of the block in parallel relation with the bottom members 1 and 2. These various pieces are all fastened together in any suitable way, as by nailing, and thus result in a built up block suitable for construction purposes.

The top and bottom members 1, 2, 14 and 15 preferably have sloping sides such as indicated at 16 and 17 for a purpose which will presently appear. It will be noted that these blocks as shown in Figs. 2 and 3 are so constructed as to provide longitudinal passageways 18 through the center thereof and vertical passageways 19 between the intermediate members 5 and 11, and the end members 3 and 9 at one end of the block and the other end members 4 and 10 at the opposite end of the block. The air spaces thus provided in the block may be useful not only for insulating purposes, but may also be used as passageways for conducting heat if radiant heating is to be used. The blocks formed may be of any suitable size, but preferably may be on the order of about 10 or 12 inches high and about 20 inches long. Thus, the smaller pieces of waste material resulting from the usual lumber construction may find their usefulness in these built up construction blocks.

When these blocks are placed together to form a wall, they are placed directly over each other as shown in Fig. 1, rather than in an overlapping relation, and are placed end-to-end and fastened together by the elongated pieces or bars 20 extending between two adjacent blocks. These fastening pieces 20 are preferably of the same shape and size as the recess between the members 14 and 15, and the top surfaces thereof are flush with the upper surfaces of adjacent members 14 and 15, to thereby enable other blocks to be placed thereover without any interference.

The vertical passageways 19 in the individual blocks thereby become in alignment and will provide elongated passages from the top to the bottom of the wall. Likewise, the longitudinal passageways 18 through the center of each of the blocks will come into alignment and will connect with the various vertical passageways to provide for a continuous flow of air therethrough.

In addition to the production of the blocks as above described, it is contemplated that further use may be made of wood scrap and waste material by the production of a plastic substance which may be used not only as a surface covering over the wood blocks, but may also be utilized for molding various sizes and shapes of other construction elements, such as the block shown in Fig. 4 or the sheets shown in Fig. 6. The wood may be placed in a suitable grinder or pulverizer and ground to a finely divided form, although the exact size or range of the divided particles is not an important consideration. In making the ground wood pulp, it is possible to use not only the scraps of waste material resulting from an actual construction job, but also twigs, small branches and the like. The ground wood pulp is then combined with a suitable binder to produce a plastic mass suitable either for spreading on the side of a wall to produce a finished surface, or for molding into a desired form. The binder which has been found to be the most satisfactory for the purposes outlined herein consists primarily of a solution of sodium silicate, powdered chalk (commonly known as whiting), and quicklime. The proportions to be used of these various materials may vary depending upon the ultimate use to which the plastic material is to be put.

A typical example which has been found to be preferable in the manufacture of the coating involves the mixture of about 1 pound of whiting with about 1 or 2 ounces of quicklime, a slow set lime, or cement. These two ingredients are then thoroughly mixed together and combined with the ground wood pulp or powder in the ratio of approximately one part of whiting and quicklime mixture to two parts of the ground wood pulp. This then forms the base of the plastic material. A solution of about 25% sodium silicate is then added to the dry mixture until a plastic or moldable state is reached. This is usually a putty-like material at this point.

This plastic material may then be used as a coating for the wall formed by the built up blocks as illustrated in Fig. 1. The coating, indicated at 21 in Fig. 1, may be spread over the wall in any suitable manner. It will be noted that this coating is forced into the triangular space between the vertically adjacent blocks wherein the sides of the triangle are represented by the sloping sides 16 and 17. This prevents any relative movement between the blocks in addition to the fastening members 20.

It has been found highly desirable in the production of these blocks to drill a plurality of holes 21a into the sides of the blocks. The blocks may then be immersed in a sodium silicate solution for the purpose of rendering the blocks completely fireproof. The plurality of holes 21a in the sides of the blocks will permit the sodium silicate solution to penetrate a greater extent into the wood and thus render the blocks fireproof to a greater degree. When the plastic substance is applied to the wall thus formed by the blocks, it will become set and present a surface suitable for painting and may thereby be used either as an exterior or interior surface. The holes 21a thus drilled in the sides of the block will also become filled with the plastic covering and thereby form an additional anchoring means for the plastic surface.

The formula presented above in the making of the plastic material is also suitable for the molding of building blocks in the manner as illustrated in Figs. 4 and 5. The preferred form of mold is illustrated in Fig. 5 and consists primarily of a box-like construction having a bottom 22, ends 23 and suitable sides. A tubular member 24 extends throughout the length of the box and beyond the ends 23 thereof. Spaced vertically extending tubular members 25 extend from the top to the bottom of the mold and through the tubular member 24. Centrally positioned and vertically extending flanges 25a are also located at each end of the mold box for forming vertical end recesses in the molded block. The plastic material is then placed in the mold around the tubular members 24 and 25, and when the material is completely set, all of the tubular members may be removed therefrom and the resulting block will be like that shown in Fig. 4 and indicated by the numeral 26 and having the end recesses 25b therein. The tubular members in the mold provide the longitudinal opening 27 and the vertical openings 28 through the block. These blocks may then be used for building purposes in substantially the same manner as the blocks shown in Fig. 1 where the passageways 27 and 28 therethrough will provide for continuous circulation of air. In this construction the inner or outer surfaces of the wall so built may also be covered with the plastic mass, if desired, so that a smooth exterior finish may be obtained.

In building a wall of the molded blocks 26, however, it is necessary to have additional means other than the blocks themselves to serve as strengthening members. To this end studding is provided in the form of T-members 35 which consist of a base portion 36 and a central flange 37 extending outwardly from the center thereof. For a purpose which will appear more fully hereinafter, a plurality of holes 38 are also provided in the T-member throughout the length thereof on opposite sides of the central flange 37.

These T-members are adapted to be set in the poured concrete foundation and extend upwardly therefrom in parallel relation with the central flange of the members all extending in the same direction, as shown in Fig. 4. It will be noted that the flange 37 terminates short of the upper end of the base 36. This is for the purpose of enabling the blocks 26 to be inserted between adjacent T-members whereby the flange 37 on one of the members will be received within the recess 25b at one end of the block 26. The block may then be lowered between the T-members and built up in this way to form a wall.

The blocks thus located between these members will thereby be anchored at one end thereof against movement by reason of the flange 37 being received within the recess 25b. It will be noted, however, that the T-member at the opposite end of the block will have its flat side against the end of the block and it is for this reason that the openings 38 are provided, whereby nails or other suitable fastening means may be driven into the end of the block through these openings and thus anchor this end of the block.

It will be further noted that the base 26 is formed of such size that it will not completely cover the opening 27 in the block and thus will not impair the passage of air therethrough. In constructions where larger T-members are necessary, it may be desirable for the recesses 25b at each end of the block to receive one edge of the base member 36 instead of the central flange 37. This is in cases where the base 36 is so large that to place it on the block as shown in Fig. 4 it might completely cover the opening 27.

A slight modification of this arrangement shown in

Fig. 4 will be necessary at corners, but the general idea and application of T-members in combination with molded blocks will be substantially the same.

A still further use of the plastic material embodied in the present invention resides in the production of sheets suitable for attachment to studding in an existing structure. This manner of use is illustrated in Fig. 6 where typical studding 29 is illustrated and which may have the usual 16 or 20 inches between centers. The plastic material is placed in a suitable mold to produce sheets 30 of any suitable width, but having a length equal to the distance between the centers of the studding. The under side of the sheets 30 are provided at each end thereof with shoulders 31 which shoulders are adapted to abut against the studding. The ends of the sheets 30 may then continue inwardly as at 32 for a short distance so that the length of the sheets at their inner sides will be substantially equal to the distance between the inner or adjacent surfaces of the studding. A suitable insulation material 33 may be molded as an integral part of the sheet or may be separate and placed adjacent the sheets 30 after which a suitable wall covering 34 may be placed on the opposite sides of the studding.

While the insulation material 33 may be of any suitable type, it has also been found that the use of the plastic material as above described is suitable for binding together many different types of vegetable growths which may be used as insulation material. For example, ground corn cobs may be substituted for the ground wood in the foregoing formula and will result in a material which will set and be useful for an insulation material. Other substances have also been used for producing insulation, such as dried twigs, leaves, sagebrush, and other dried materials of a vegetable nature. All of these substances are adapted to be applied directly to the sheet 30 while in the mold and thus form an integral unit including both a cover sheet and insulation.

It will be evident that the proportions given above in the production of the plastic material may vary, depending upon the use to which the final material is to be put. The above proportions are those preferred in the formation of the coating 21 and the manufacture of the blocks 26. It may be taken as a general rule that where the tensile strength decreases, more of the ground wood pulp may be used. For example, in the manufacture of the sheets 30 as shown in Fig. 6, the ends thereof may contain less wood pulp than the center, because the tensile strength at the ends will be greater. This, however, is a matter of choice and such sheets may be made completely uniform if preferred.

Fig. 7 illustrates another use of a molded construction member made in accordance with the present invention. The sheet or block 35 may be made in any suitable size and is particularly adapted for use in ceilings. Each block has a plurality of holes 36 extending longitudinally therethrough and each hole 36 is adapted to receive a tubular member 37 in each end thereof. A plug 38 is received within each tubular member 37 and protrudes a short distance therefrom, as shown, whereby the protruding part will be received within the similar tubular member in the next adjacent block 35. A series of these blocks in alignment will extend from one end of a room to another and a plurality of such series will complete a ceiling.

The blocks may be suspended and held in place by providing a series of tubes or pipes 39. Spring supporting clips 40 are suspended from the pipes 39 and are looped at their lower ends to receive the connections between the blocks consisting of the tubes 37 and plugs 38. Recesses 41 are located at each end of each block to receive the portion of the spring clips 40 which extend between the ends of adjacent blocks. These recesses 41 preferably do not extend all the way to the under side of the blocks, so that the ceiling will present a smooth and even appearance with all the blocks in close abutting relation.

It will be apparent from the foregoing description that the construction material, in all of its forms, as disclosed herein, enables a great amount of wood scrap and waste material to be utilized which would otherwise be discarded as useless. Because of the manner in which the building blocks are formed, both the built up type and the molded type, they are extremely economical. The same is true with respect to the plastic material embodied in the invention, since the waste material used therein is plentiful, the production will be most economical.

Changes may be made in the form, construction and arrangement of parts of the construction members, and in the ratio of ingredients in the plastic substance from those disclosed herein without in any way departing from the spirit of the invention or sacrificing any of the attendant advantages thereof, provided, however, that such changes fall within the scope of the claims appended hereto.

The invention is hereby claimed as follows:

1. A unitary building block for use as a construction member comprising a plurality of horizontally spaced bars extending longitudinally of the block in vertically spaced and superposed relation, a plurality of bars extending transversely of the block from one side thereof to the other between said first named bars, all of said bars being secured together to form a block, some of said last named bars being spaced apart to form open passageways for air through said block, and spacer members in the spaces between the transverse bars having the outer faces thereof in the same vertical plane as the end face of the transverse bar adjacent thereto, whereby opposing sides of the block will be continuous and uninterrupted.

2. A unitary building block for use as a construction member comprising a plurality of horizontally spaced bars extending longitudinally of the block in vertically spaced and superposed relation and a plurality of bars extending transversely of the block from one side thereof to the other between said first named bars, all of said bars being secured together to form a block, some of said last named bars being spaced apart to form open passageways for air through said block, and spacer members in the spaces between the transverse bars having the outer faces thereof in the same vertical plane as the end face of the transverse bar adjacent thereto, whereby all of the bars and spacer members at opposing sides of the block will have faces in the same vertical plane, and a plurality of openings extending inwardly from the outer surfaces of said block closed at their inner ends, all of the surfaces of said block, including the inner surfaces of said openings, being impregnated with a fire resistant material.

References Cited in the file of this patent

UNITED STATES PATENTS

| Number | Name | Date |
|---|---|---|
| 221,968 | Marsh | Nov. 25, 1879 |
| 443,250 | Buchner | Dec. 23, 1890 |
| 449,214 | Enricht | Mar. 31, 1891 |
| 625,372 | Wheeler | May 23, 1899 |
| 836,017 | Douglass | Nov. 13, 1906 |
| 1,057,704 | Brown | Apr. 1, 1913 |
| 1,252,428 | Goss | Jan. 8, 1918 |
| 1,302,260 | White | Apr. 29, 1919 |
| 1,320,880 | Ljungdell | Nov. 4, 1919 |
| 1,413,562 | Anderson | Apr. 25, 1922 |
| 1,413,819 | Wilson | Apr. 25, 1922 |
| 1,456,063 | Kreitzer | May 22, 1923 |
| 1,555,433 | Olsson | Sept. 29, 1925 |
| 1,582,721 | Adams | Apr. 27, 1926 |
| 1,587,827 | Freudenberg | June 6, 1926 |
| 1,785,499 | Sayers | Dec. 16, 1930 |
| 1,818,704 | Frantz | Aug. 11, 1931 |
| 1,912,290 | Marks | May 30, 1933 |
| 1,959,966 | Robinson | May 22, 1934 |
| 2,107,144 | Davis et al. | Feb. 1, 1938 |
| 2,341,757 | Brenneman et al. | Feb. 15, 1944 |